US007606635B2

(12) United States Patent
Fisher

(10) Patent No.: US 7,606,635 B2
(45) Date of Patent: Oct. 20, 2009

(54) RADIO FREQUENCY ENABLED CONTROL OF ENVIRONMENTAL ZONES

(75) Inventor: James L. Fisher, Coon Rapids, MN (US)

(73) Assignee: Honeywell International Inc., Morristwon, NJ (US)

( * ) Notice: Subject to any disclaimer, the term of this patent is extended or adjusted under 35 U.S.C. 154(b) by 0 days.

(21) Appl. No.: 11/528,901

(22) Filed: Sep. 28, 2006

(65) Prior Publication Data
US 2007/0021872 A1    Jan. 25, 2007

Related U.S. Application Data

(63) Continuation of application No. 10/874,792, filed on Jun. 23, 2004, now Pat. No. 7,130,720.

(51) Int. Cl.
G01M 1/38    (2006.01)
(52) U.S. Cl. .................. 700/277; 700/276; 700/278
(58) Field of Classification Search ............... 236/1 B; 700/277, 278, 276
See application file for complete search history.

(56) References Cited

U.S. PATENT DOCUMENTS

| | | | |
|---|---|---|---|
| 4,553,695 A | | 11/1985 | Grant |
| 4,630,221 A | * | 12/1986 | Heckenbach et al. ........ 700/277 |
| 4,969,508 A | | 11/1990 | Tate et al. |
| 5,224,648 A | | 7/1993 | Simon et al. |
| 5,271,558 A | | 12/1993 | Hampton |
| 5,341,988 A | * | 8/1994 | Rein et al. ................. 236/49.3 |
| 5,345,966 A | | 9/1994 | Dudley |
| 5,364,304 A | | 11/1994 | Hampton |
| 5,390,206 A | | 2/1995 | Rein et al. |
| 5,449,112 A | | 9/1995 | Heitman et al. |
| 5,449,319 A | * | 9/1995 | Dushane et al. ............. 454/319 |
| 5,595,342 A | | 1/1997 | McNair et al. |
| 5,605,280 A | | 2/1997 | Hartman |
| 5,644,302 A | | 7/1997 | Hana et al. |
| 5,706,190 A | | 1/1998 | Russ et al. |
| 5,711,480 A | | 1/1998 | Zepke et al. |
| 5,810,245 A | | 9/1998 | Heitman et al. |
| 5,833,134 A | | 11/1998 | Ho et al. |
| 5,839,654 A | | 11/1998 | Weber |
| 5,860,473 A | * | 1/1999 | Seiden ........................ 165/208 |
| 6,116,512 A | | 9/2000 | Dushane et al. |
| 6,196,467 B1 | | 3/2001 | Dushane et al. |

(Continued)

OTHER PUBLICATIONS

Honeywell, EMM-3U Universal Electronic Minizone™ Panel, 2002.

Primary Examiner—Kidest Bahta
Assistant Examiner—Nathan Laughlin

(57) ABSTRACT

A system, apparatus and method for controlling environmental zones in a residence or other building using radio frequency enabled environmental controllers. At least one damper is associated with each of the various zones. From each environmental controller, a command is wirelessly transmitted, where the command includes an environmental control command and a respective unique identifier associated with the environmental controller. The command is received at a zone controller, and each environmental controller is bound with a respective one of the zones using the respective unique identifier associated with the environmental controller. The damper(s) associated with the zone that is bound with the environmental controller associated with the unique identifier from the command are operated in response to the zone controller. Environmental adjustment equipment is operated, which is responsive to the zone controller to execute the environmental control command.

15 Claims, 8 Drawing Sheets

U.S. PATENT DOCUMENTS

| | | |
|---|---|---|
| 6,260,765 B1 | 7/2001 | Natale et al. |
| 6,349,883 B1 | 2/2002 | Simmons et al. |
| 6,364,211 B1 | 4/2002 | Saleh |
| 6,454,179 B1 | 9/2002 | Neve et al. |
| 6,508,407 B1 | 1/2003 | Lefkowitz et al. |
| 6,622,925 B2 | 9/2003 | Carner et al. |
| 2001/0048030 A1 | 12/2001 | Sharood et al. |
| 2003/0010489 A1 | 1/2003 | Eoga |
| 2003/0050737 A1 | 3/2003 | Osann |
| 2003/0066897 A1 | 4/2003 | Carner et al. |
| 2003/0067889 A1* | 4/2003 | Petite ......................... 370/310 |
| 2004/0194484 A1* | 10/2004 | Zou et al. ..................... 62/186 |
| 2005/0095978 A1* | 5/2005 | Blunn et al. ................. 454/229 |

* cited by examiner

RADIO FREQUENCY ENABLED CONTROL OF ENVIRONMENTAL ZONES

CROSS-REFERENCE TO RELATED APPLICATIONS

This is a continuation application of application Ser. No. 10/874,792, filed Jun. 23, 2004, now U.S. Pat. No. 7,130,720 the content of which is incorporated herein by reference in its entirety.

FIELD OF THE INVENTION

This invention relates in general to environmental control systems, and more particularly to a system, apparatus and method for facilitating installation and enhancing flexibility of multi-zone environmental control systems.

BACKGROUND OF THE INVENTION

Commercial and residential environmental control systems generally involve controlling any one or more environmental characteristics such as temperature, humidity, air filtration, and the like. While a single environmental control system may control an entire residence (or other facility), various portions of the residence may not be environmentally controlled to the liking of occupants of those portions of the residence. For example, some rooms in a home may be a longer distance from a central heating, ventilation and air conditioning (HVAC) system, and are not cooled and/or heated as well relative to other rooms closer to the HVAC system. As another example, some rooms may be physically located such that heating or cooling those rooms is more difficult. More particularly, a basement room may require less air conditioning during summer months due to it being underground. Similarly, a south-facing room on an above-ground floor may naturally be warmer than other rooms due to direct sunlight. In yet other situations, occupants of some rooms may simply prefer a higher or lower temperature than occupants of other rooms.

In any of these types of situations, environmental control of particular rooms or other areas of a residence may prove to be difficult. For example, temperature differences in various parts of the home may result in repeated thermostat adjustments, damper adjustments, the use of portable heating/cooling devices, etc. In order to address these issues, homes or other facilities may use "zoning" to allow for independent control of each of the various established zones. For example, a home may be divided into two different zones, where each zone is controlled by its own thermostat or a thermostat that is configured to independently control each of the zones.

However, dividing homes or other facilities into zones and providing separate thermostats for each zone requires additional wiring. This may be particularly burdensome in residences where a single-zone system is to be upgraded to a multi-zone system. Invasive wiring of thermostats and zone control systems into existing walls and other structures can be expensive and inconvenient for the homeowner. For example, multiple thermostats may need to be wired to a zone control panel, which in turn is wired to the HVAC or other environmental control system.

Accordingly, there is a need in the environmental control industry for a manner of alleviating the cost and inconvenience of installing and utilizing multi-zone environmental control systems. The present invention fulfills these and other needs, and offers other advantages over prior art approaches.

SUMMARY OF THE INVENTION

To overcome limitations in the prior art described above, and to overcome other limitations that will become apparent upon reading and understanding the present specification, the present invention discloses a system, apparatus and method for controlling environmental zones in a residence or other building using radio frequency enabled environmental controllers.

In accordance with one embodiment of the invention, a method is provided for controlling environmental conditions in a plurality of zones using a corresponding plurality of environmental controllers. The method involves associating at least one respective damper with each of the plurality of zones. From each environmental controller, a command is transmitted via unidirectional wireless communication, where the command includes an environmental control command and a respective unique identifier associated with the environmental controller. The command is received at a zone controller, and each environmental controller is bound with a respective one of the zones using the respective unique identifier associated with the environmental controller. The method further involves operating the damper(s) associated with the zone that is bound with the environmental controller that is associated with the unique identifier from the command, where the damper(s) is operated in response to the zone controller. Environmental adjustment equipment is operated, which is responsive to the zone controller to execute the environmental control command.

According to more particular embodiments of such a method, each environmental controller may be positioned within the zone that is bound with the environmental controller. In another embodiment, binding each environmental controller involves performing such binding in connection with an installation procedure. In another particular embodiment, the command is transmitted using a Manchester encoding with binary amplitude modulation at a center radio frequency of approximately 345 MHz, and where the command includes a preamble. In yet another particular embodiment, the command is transmitted more than once to increase the probability that the zone controller receives the command. In other embodiments, the command is transmitted in response to user input, environmental conditions at the environmental controller deviating from and/or returning to desired conditions, the expiration of a predetermined time interval relative to a previous transmission from the environmental controller, etc.

In still other particular embodiments of such a method, the command may include a cyclic redundancy check to detect corruption of the command. Such a method may further involve checking the command received by the zone controller using the cyclic redundancy check, and if corruption of the command is detected, the command may be discarded before binding each environmental controller, operating the damper(s), and directing the environmental adjustment equipment. Further, a respective time interval may be associated with each of the zones, where the command is associated with the time interval of the zone bound to the environmental controller that is associated with the unique identifier from the command. If corruption of the command is not detected, the method of such an embodiment involves starting the time interval associated with the command in connection with the receiving of the command. Otherwise, each time interval exceeding a predetermined limit may be treated as receiving a command having the environmental control command of an idle command.

In another particular embodiment, binding each environmental controller involves further comprises, for each zone, operating a respective binding switch associated with the zone. An association is established between the zone and the environmental controller that is associated with the unique identifier from the command, thereby binding the environmental controller that transmits the command with the zone. Further, a visual indication may be initiated after operating the respective binding switch, and this visual indication may be terminated after establishing the association.

In another embodiment of the method, a value of the environmental control command includes any one or more of a heat command, a cool command, a fan command, an auxiliary heat command, an emergency heat command, an auxiliary cool command, a humidity control command, an extra command, an idle command, an error command, an air quality alarm command, an air quality venting command, a motion detection command, or a service alarm command. In one embodiment the damper(s) is opened in connection with the operating the damper(s) in response to the environmental control command having the value that is not the idle command, and the damper(s) is closed in connection with operating the damper(s) in response to the idle command. In another particular embodiment, directing the environmental adjustment equipment involves operating at least one of a heat relay, a cool relay, a fan relay, an auxiliary heat relay, an emergency heat relay, an auxiliary cool relay, a humidity control relay, an extra relay, a first stage pump relay, a second stage pump relay, or a changeover valve relay.

In still other embodiments of such a method, the zone controller may resolve a conflict between the command received from a first one of the environmental controllers and the command received from a second one of the environmental controllers, by sequentially directing the environmental adjustment equipment to execute the command received from the first one of the environmental controllers and the command received from the second one of the environmental controllers.

In accordance with another embodiment of the invention, a zone controller is provided, and is arranged to control the environmental conditions in a plurality of environmental zones. The zone controller includes a radio frequency receiver adapted to receive commands transmitted from the plurality of zones, where each command includes an environmental control command and a unique identifier. A plurality of binding switches is provided, where each is adapted to bind a respective one of the zones with a respective one of the unique identifiers. The zone controller includes a plurality of damper output ports, each arranged to operate at least one respective damper associated with a respective one of the zones. An equipment output port is arranged to operate environmental adjustment equipment. The zone controller further includes a zone sequencer adapted for each command to control the equipment output port based on the environmental control command, and to control the plurality of damper output ports based on the environmental control command and on the zone bound to the unique identifier.

In a more particular embodiment, the zone controller includes an error check circuit adapted to detect corruption of each command, and to discard each command with detected corruption. In another embodiment, a visual indicator is arranged to indicate that a binding operation is in progress, where the binding operation is initiated by activating at least one of the binding switches. In another embodiment, the zone sequencer includes at least one relay coupled to the equipment output port, where the relay(s) comprises any of a heat relay, a cool relay, a fan relay, an auxiliary heat relay, an emergency heat relay, an auxiliary cool relay, a humidity control relay, an extra relay, a first stage pump relay, a second stage pump relay, or a changeover valve relay.

In another embodiment, the zone controller includes at least one controller input port, where each controller input port associated with a respective one of the zones, where each controller input port is arranged to receive at least one environmental control signal. In such an embodiment, the zone sequencer is further adapted for each controller input port to control the equipment output port based on the environmental control signal(s), and to control the damper output ports based on the environmental control signal(s) and on the zone associated with the controller input port.

In another embodiment, an HVAC system is provided, which is arranged to control the environmental conditions in a plurality of zones. The system includes a plurality of wireless environmental controllers, an HVAC subsystem, a plurality of dampers, and a zone controller. Each of the plurality of wireless environmental controllers is adapted to transmit commands, where each command includes an environmental control command and a unique identifier for the wireless environmental controller transmitting the command. Each of the zones is respectively associated with at least one of the dampers. The zone controller includes a radio frequency receiver adapted to receive each command, a plurality of binding switches each adapted to bind a respective one of the zones with a respective one of the unique identifiers, and a zone sequencer. The zone sequencer is adapted for each command to control the HVAC subsystem based on the environmental control command, and to control the plurality of dampers based on the environmental control command and on the zone bound to the unique identifier.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides control of environmental zones in a residence or other building using radio frequency enabled environmental controllers. Environmental controllers such as thermostats are equipped with wireless transmitters. Commands issued from the thermostats include respective unique identifiers associated with its respective thermostat, where the unique identifier is used to bind the particular thermostat with a respective zone in a multi-zone environment. A zone controller capable of wirelessly receiving these commands controls HVAC equipment such as dampers in the zone associated with the transmitting thermostat. In this manner, environmental control of various zones may be effected using wireless means, thus obviating the need to introduce wiring between the thermostats and zone controller.

Figure 1:
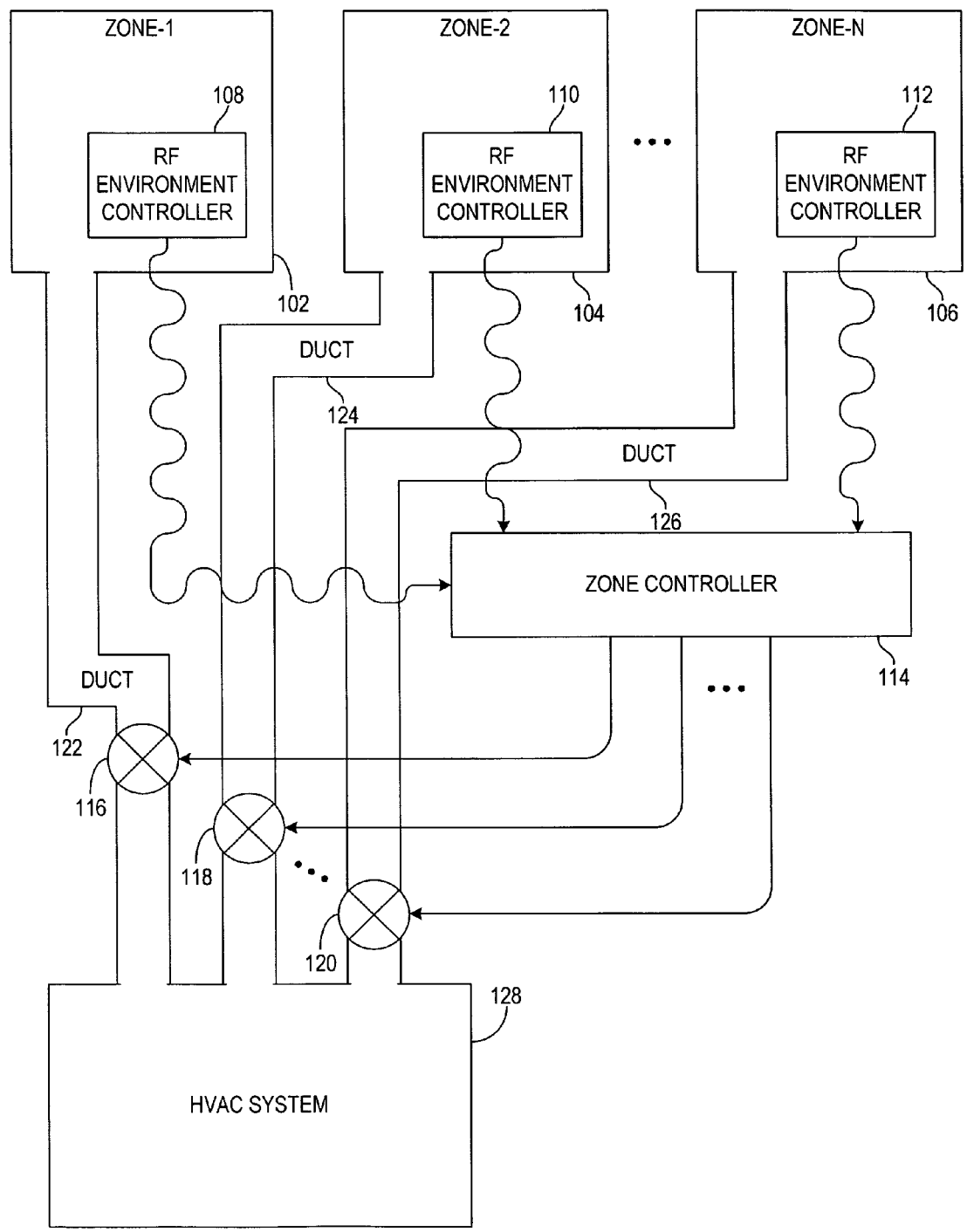
FIG. 1 is a block diagram of an embodiment for control of a plurality of environmental zones by a radio frequency enabled environmental controllers.

FIG. 1 is a block diagram of an embodiment for control of a plurality of environmental zones 102, 104, 106 by radio frequency enabled environmental controllers 108, 110, 112. Each zone 102, 104, 106 is typically a room or group of rooms in a building such as a residence or office building. Each zone 102, 104, 106 has a respective environmental controller 108, 110, 112 that is typically physically located within the zone. Environmental controller 108 is located within zone-1 102, environmental controller 110 is located within zone-2 104, and environmental controller 112 is located within zone-N 106.

Each environmental controller 108, 110, 112 detects the environmental conditions local to the respective zone 102, 104, 106 and transmits commands to adjust the local environment to the zone controller 114. For example, a heat command is transmitted by the environmental controller 108 for a zone 102 when the temperature in the zone 102 falls below an acceptable level. For this example when the temperature in zone 102 recovers to an acceptable level the environmental controller 108 transmits a command to end the heating cycle for zone 102. Example environmental conditions that may be controlled are temperature, humidity, and air quality including carbon monoxide concentration. The commands are sent from each environmental controller 108, 110, 112 to the zone controller 114 via a radio frequency transmission. The radio frequency transmissions are unidirectional from each environmental controller 108, 110, 112 to the zone controller 114. There are no transmissions from the zone controller 114 to any of the environmental controllers 108, 110, 112.

The zone controller 114 directs the opening and closing of dampers 116, 118, 120 in response to the commands received from the environmental controllers 108, 110, 112. The zone controller 114 and the dampers 116, 118, 120 are typically located near the heating, ventilation and air conditioning (HVAC) system 128. Each damper 116, 118, 120 is associated with a respective environmental zone 102, 104, 106 by a respective duct or ducts 122, 124, 126. Damper 116 is associated with zone-1 102 by duct 122, damper 118 is associated with zone-2 104 by duct 124, and damper 120 is associated with zone-N 106 by duct 126. For example, when environmental controller 108 in zone-1 102 commands for heat delivery, then damper 116 is opened by the zone controller 114 so that heat can be delivered from the HVAC system 128 to zone-1 102. For this example the other dampers 118, 120 may be open or closed depending upon whether environmental controllers 110, 112 are also calling for heat delivery.

The zone controller 114 resolves any conflicts between the environmental controllers 108, 110, 112. For example, environmental controller 108 may be transmitting heat commands while environmental controller 110 is transmitting cool commands. This may happen for example on a cool sunny day when the windows of zone-2 104 are receiving abundant sunshine while zone-1 102 is shaded. Typically the HVAC system 128 cannot heat and cool simultaneously. The zone controller 114 resolves conflicting commands by sequentially performing the conflicting commands. In the absence of conflicts the environmental control decisions are made by the environmental controllers 108, 110, 112 and not by the zone controller 114. The zone controller 114 resolves conflicts and also may direct the changeover between conflicting commands, such as a time delay required by the HVAC system 128 when switching from heating to cooling. The zone controller 114 may have additional timers such as a timer that activates emergency heat when the duration of a heating cycle exceeds a specified limit.

Using radio frequency enabled environmental controllers 108, 110, 112 and dampers 116, 118, 120 located near the HVAC system 128 permits adding environmental zones 102, 104, 106 to retrofit an existing HVAC system 128 using the existing ducts 122, 124, 126 and wiring. Ducts 122 124 126 and wiring within the living space are difficult to modify, but the HVAC system 128 is typically located outside of the living space where modifications may be made. For the retrofit application the required duct 122, 124, 126 and wiring modifications are localized to the vicinity of the HVAC system 128 when radio frequency enabled environmental controllers 108, 110, 112 are used. For new construction the radio frequency enabled environmental controllers 108, 110, 112 simplify the required wiring. The radio frequency environmental controllers 108, 110, 112 also permit a mobile location for each of the environmental controllers 108, 110, 112 within the corresponding zone 102, 104, 106 for both retrofit applications and new construction.

In one embodiment, the dampers 116, 118, 120 when open allow forced air heating or air conditioning to be delivered from the HVAC system 128 via ducts 122, 124, 126 to the zones 102, 104, 106. In another embodiment, the dampers 116, 118, 120 are valves in a hot water (or other fluid) HVAC system 128 with the ducts 122, 124, 126 being pipes that circulate the hot water/fluid to radiators in the respective zones 102, 104, 106.

Figure 2:
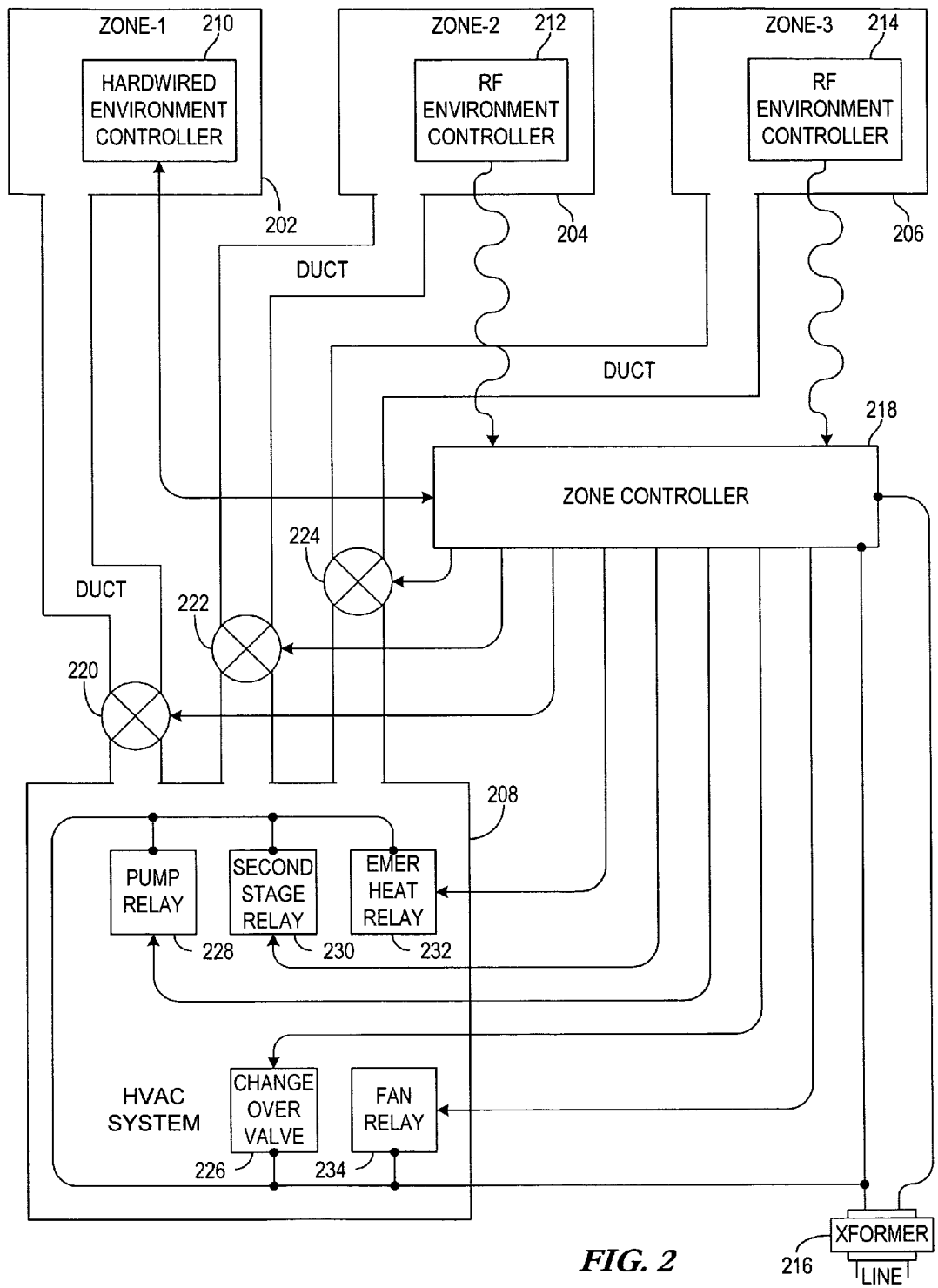
FIG. 2 is a system diagram of an embodiment for control of environmental zones and a HVAC system by radio frequency enabled environmental controllers.

FIG. 2 is a system diagram of a representative embodiment for control of environmental zones 202, 204, 206 and a HVAC system 208 by hardwired environmental controller 210 and radio frequency enabled environmental controllers 212, 214. In such an embodiment, the environmental zone-1 202 is controlled by a hardwired environmental controller 210. This may be useful in a retrofit application where there is an existing environmental controller that is in an appropriate location for one of the zones. In general, each zone 202, 204, 206 may have an environmental controller that is either hardwired or radio frequency enabled.

The line transformer 216 provides power to the HVAC system 208 and the zone controller 218. Typically the line transformer 216 provides power of 24 volts alternating current. For some systems multiple transformers are used to provide the function of the line transformer 216 such as separate transformers for the zone controller 218, the heating portion of the HVAC system 208, and the cooling portion of the HVAC system 208. The zone controller 218 controls the power to open and close the dampers 220, 222, 224. The zone controller 218 may also provide power to the hardwired environmental controller 210. Alternatively, the hardwired environmental controller 210 may be powered by an independent power supply such as a thermocouple or a battery, or the hardwired environmental controller 210 may be may be an electromechanical controller that does not require power for operation. The radio frequency enabled environmental controllers 212, 214 are typically powered by respective supplies such as a local line transformer, a battery, a solar cell, or a combination thereof.

The HVAC system 208 shows a representative embodiment of a heat pump installation with two stages and emergency heat. The zone controller 218 directs the HVAC system 208 in response to commands received from the environmental controllers 210, 212, 214 in the respective environmental zones 202, 204, 206. When the zone controller 218 receives a heat command from one or more of the environmental controllers 210, 212, 214, the zone controller 218 puts the changeover valve 226 into heat mode and then activates the pump relay 228. The zone controller 218 may need to delay the beginning of this heating cycle when a previous cooling or heating cycle was recently completed. The zone controller 218 also opens the dampers 220, 222, 224 corresponding to the zones 202, 204, 206 currently calling for heat. When the zone controller 218 receives an auxiliary heat command from one or more of the environmental controllers 210, 212, 214, the zone controller 218 additionally activates the second stage compressor relay 230 to provide additional heat. When the zone controller 218 detects that the duration of a heating cycle has exceeded a specified time limit without restoring environmental conditions in one or more zones 202, 204, 206, then the zone controller 218 may also activate the emergency heat relay 232 to provide extra additional heat such as an electrical heating element. Alternatively, when the zone controller 218 receives an emergency heat command from one or more of the environmental controllers 210, 212, 214, the zone controller may activate the emergency heat relay 232.

When the zone controller 218 receives a cool command from one or more of the environmental controllers 210, 212, 214, the zone controller 218 puts the changeover valve 226 into cool mode and then activates the pump relay 228. The zone controller 218 may need to delay the beginning of this cooling cycle when a previous heating or cooling cycle was recently completed. The zone controller 218 also opens the dampers 220, 222, 224 corresponding to the zones 202, 204, 206 calling for cooling. When the zone controller 218 receives an auxiliary cool command from one or more of the environmental controllers 210, 212, 214, the zone controller 218 additionally activates the second stage compressor relay 230 to provide additional cooling. When the zone controller 218 receives a fan command from one or more of the environmental controllers 210, 212, 214, the zone controller 218 activates the fan relay 234. The zone controller 218 also opens the dampers 220, 222, 224 corresponding to the zones 202, 204, 206 calling for the fan.

When the zone controller 218 receives an idle command from one of the environmental controllers 210, 212, 214 the zone controller 218 closes the one of the dampers 220, 222, 224 corresponding to the zone of this environmental controller. If this damper closing causes all dampers 220, 222, 224 to be closed, before closing this damper the zone controller 218 completes the current cycle by deactivating all relays 226, 228, 230, 232, 234. The zone controller 218 also manages conflicts between the commands received from the various environmental controllers 210, 212, 214 as previously discussed.

Figure 3:
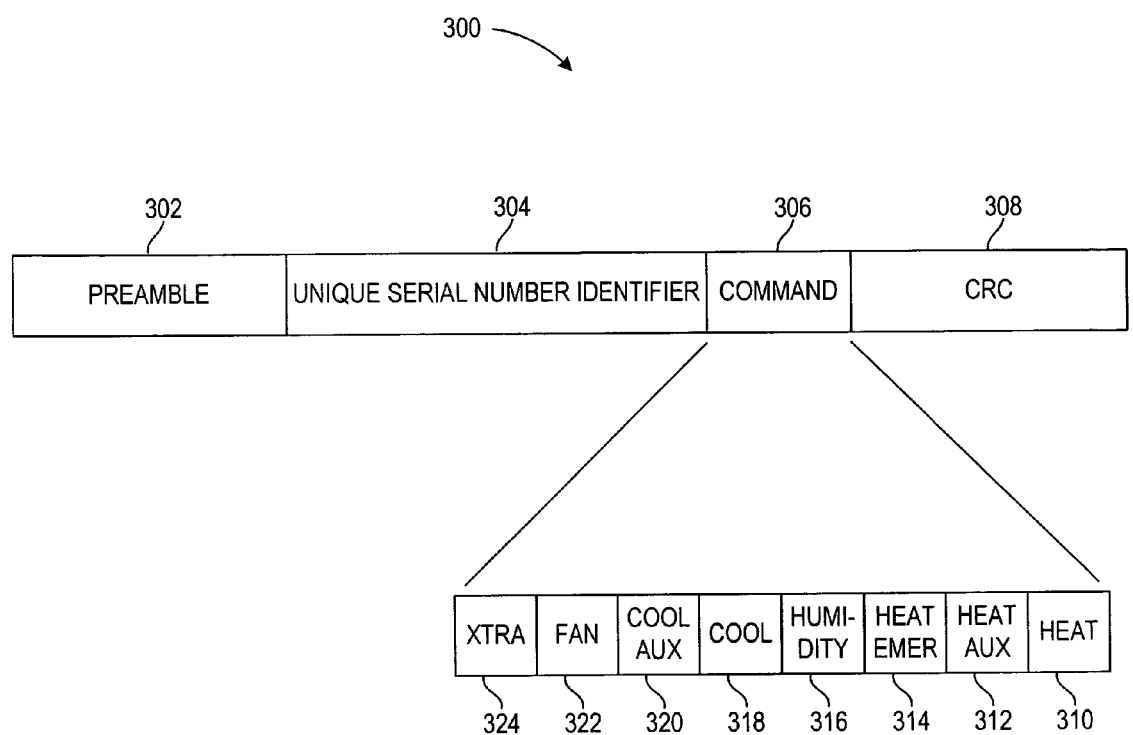
FIG. 3 is a diagram of an example command packet transmitted by a radio frequency environmental controller.

FIG. 3 is a diagram of an example command packet 300 transmitted by a radio frequency environmental controller. The command packet 300 includes the fields of a preamble field 302, an identifier field 304 containing a unique serial number, a command field 306, and a cyclic redundancy check (CRC) field 308. The fields 304, 306, 308 can appear in any order in the command packet 300 although the CRC field 308 is typically the last field in the command packet 300. The command packet 300 may be transmitted with a Manchester encoding using binary amplitude modulation at a center transmission frequency of 345 MHz.

The preamble field 302 announces the beginning of the packet 300. The preamble field 302 is transmitted at the beginning of every command packet 300. The same value is used for every preamble field 302. A receiver of the packet 300 uses the preamble field 302 to synchronize the reception of the packet 300. For one example the preamble field 302 is 16 bits long.

The identifier field 304 contains a unique serial number. Each radio frequency environmental controller is given a serial number during manufacture. The serial numbers may be assigned to environmental controllers in a pseudo-random order. The manufacturer unilaterally attempts to ensure that only one radio frequency environmental controller using the same encoding, modulation, and center transmission frequency has a particular serial number. The serial number is not necessarily unique among all radio frequency environmental controllers or radio frequency transmitters. The identifier field 304 contains the serial number of the radio frequency environmental controller transmitting the command packet 300. The identifier field 304 in the packet 300 allows the source of the packet 300 to be determined. One use for the unique identifier field 304 is to prevent interference from an independently installed environmental controller in a neighboring building. In one embodiment, the identifier field 304 is 24 bits in length.

The command field 306 may be composed of individual command bits. The command field 306 for this example is 8 bits long with up to 8 possible commands. These 8 commands are the heat command 310, the auxiliary heat command 312, the emergency heat command 314, the humidity command 316, the cool command 318, the auxiliary cool command 320, the fan command 322, and the extra command 324. Not all 8 commands may be implemented in a particular model of radio frequency environmental controller. An idle command has no command bits set. An idle command is transmitted by an environmental controller for a zone while the zone has an acceptable environmental condition.

It will be appreciated that alternative command encodings may be used and the command 306 may have more or fewer than 8 bits. For example, simultaneously sending a heat command 320, the cool command 318, and the fan command 322 may indicate an error command. In another embodiment, rather than having individual command on/off flag bits 310, 312, 314, 316, 318, 320, 322, and 324, the command 306 could be encoded such that an operational code is defined for some or all values of the entire command 306. As a more particular example, a command 306 having 8 bits results in as many as 256 operational codes, potentially allowing a greater number of specific commands. Other such commands may include, for example, an air quality alarm or venting operation when smoke or carbon monoxide is detected by the environmental controller, a motion detector on the environmental controller to activate occupied zone environmental control that may be different from the unoccupied zone environmental control, and a service alarm from the environmental controller that is automatically generated or generated in response to user input and may cause an alarm or a telephone call to summon service such as a maintenance service, police, or an ambulance.

A receiver of a command packet 300 may receive a command packet 300 that has been corrupted. The corruption may be caused by interference from other radio frequency transmitters in the vicinity. The CRC field 308 allows corrupted command packets 300 to be detected by the receiver. The CRC field 308 is calculated over the command field 306 and typically also the identifier field 304, but not the preamble field 302. A receiver of a command packet 300 recalculates the CRC and compares the recalculated CRC with the CRC 308 received in the packet. When these CRC differ, a receiver typically discards the corrupted packet. To help ensure that an individual command is not lost, one embodiment involves transmitting each command packet 300 multiple times every time a command update is needed. For one example the CRC field 308 is 16 bits long.

Figure 4:
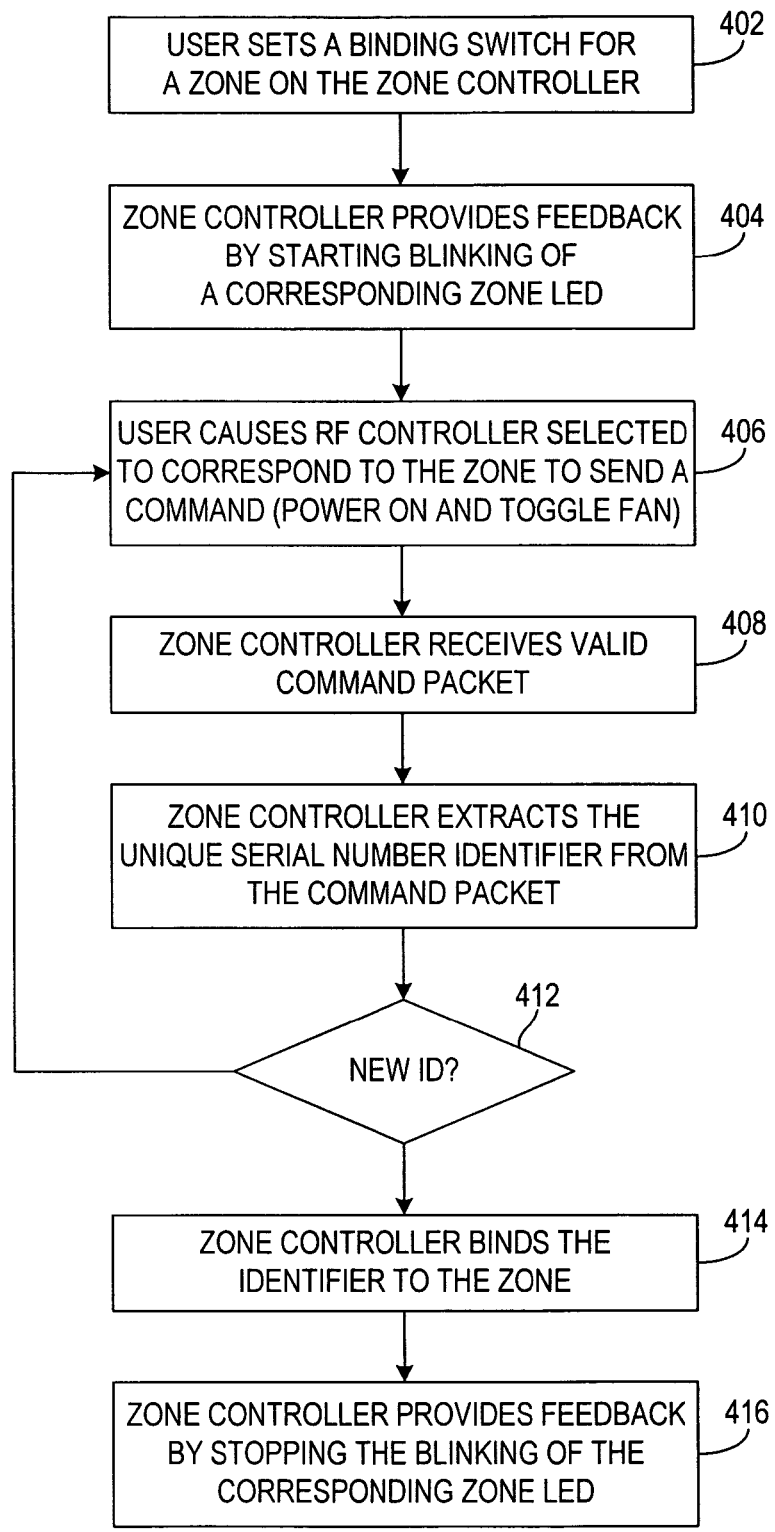
FIG. 4 is a flow diagram of an example process for binding a radio frequency environmental controller to a zone.

FIG. 4 is a flow diagram of an example process for binding a radio frequency environmental controller to a zone. The binding process forms an association between the serial number of an environmental controller and the zone corresponding to the environmental controller. The binding process is repeated for each environmental controller.

The binding process typically begins with the user or installer bringing the radio frequency environmental controllers to the location in the building of the zone controller. All environmental controllers are powered off. The user closes a binding switch for a particular zone number on the zone controller at step 402 and selects an environmental controller to correspond to the zone. Typically the user writes the zone number and the zone name on a label affixed to the back of the selected environmental controller. An example zone name is living room. The zone number is determined by the binding switch that was closed. The zone name is determined by the damper coupled to that zone number and the environmental zone associated with that damper by the ducts. At step 404 the zone controller provides feedback that binding is in process by starting the blinking of a LED corresponding to the zone number.

At step 406 the user powers on the selected environmental controller to cause it to issue a command packet. Typically the environmental controller transmits a command packet immediately after power on and this packet is successfully received by the zone controller. Occasionally additional packets are needed and the user may cause additional packets to be transmitted by the environmental controller by toggling the fan setting on the environmental controller. At step 408 the zone controller receives a command packet that passes the CRC check.

At step 410 the identifier is extracted from the command packet received by the zone controller. At step 412 the extracted identifier is compared with identifiers from any existing bindings. When the extracted identifier matches an existing binding the extracted identifier is ignored by returning to step 406. This ensures that there is an environmental controller for each zone and allows the previously bound environmental controllers to remain powered on during the binding of additional environmental controllers. When the extracted identifier does not match any existing binding the process proceeds to step 414.

At step 414 the zone controller binds the new extracted identifier to the zone number and thereby the associated environmental zone. A command packet received thereafter with this identifier is processed as a command for the zone of the binding. The zone controller provides feedback that the binding is complete for the environmental controller by stopping the blinking of the LED corresponding to the zone number at step 416. After a binding is completed, the binding switch for the zone remains in the closed position.

After all bindings are complete the user typically returns the environmental controllers to their designated environmental zones. The user may verify the bindings by toggling the fan command on each environmental controller and checking fan operation in each environmental zone. If it is determined that an incorrect binding was made for a zone, the binding switch for that zone number is opened causing the zone controller to erase the binding. A new binding may then be made for the zone.

Figure 5:
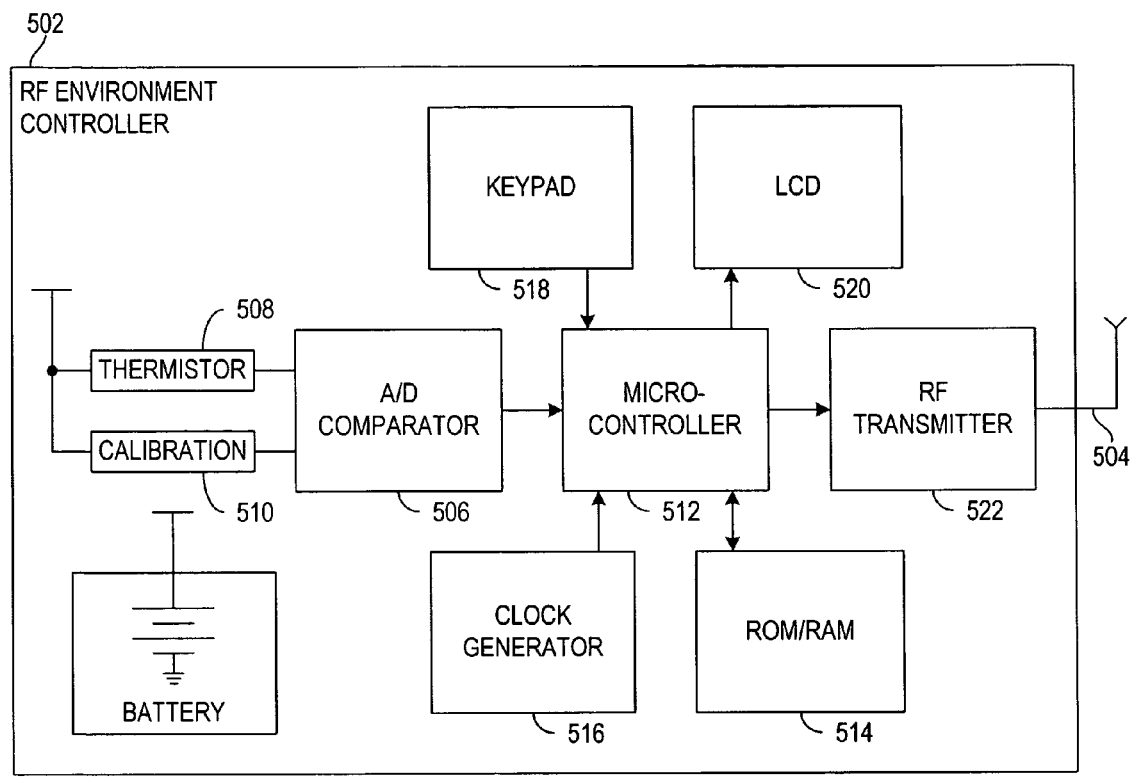
FIG. 5 is a block diagram of a representative embodiment of a radio frequency environmental controller.

FIG. 5 is a block diagram of a representative embodiment of a radio frequency environmental controller 502 with a thermostat function. A humidistat function can similarly be provided. The environmental controller 502 transmits command packets to a receiver via antenna 504. The environmental controller 502 is only a transmitter. The environmental controller 502 contains no circuitry to receive packets. The environmental controller 502 is located within an environmental zone. While command packets are unidirectional transmissions, control of the environmental zone is closed loop control since feedback is provided by the commanded adjustments to the environmental conditions in the zone.

An analog to digital comparator 506 is used to translate an analog temperature reading from the thermistor 508 into a digital format. The comparator 506 is used to measure the RC time constant of the thermistor 508 and a capacitor. The RC time constant is measured by counting the number of clock cycles needed to charge this RC circuit to a trip point set by a resistor divider. The RC time constant of the precision calibration resistor 510 and the same capacitor is similarly measured. The calibration resistor 510 is selected to have a resistance equal to the thermistor 508 at a center temperature near the middle of the desired measurement range. The difference between the two measurement counts provides a digital value for the difference between the center temperature and the environmental temperature. To reduce power consumption the temperature measurement is performed intermittently and the measurement circuits including the comparator 506 are powered down between measurements.

The microcontroller 512 controls the environmental controller 502 via programs and data stored in the RAM/ROM 514. A clock generator 516 provides the clock for the microcontroller 512. This clock is a low frequency clock to minimize power consumption by the microcontroller 512 and associated components. A user interface is provided by the keypad 518 and liquid crystal display (LCD) 520. The keypad allows the user to specify the setpoints for the humidity, the regular and auxiliary cooling, and the regular, auxiliary, and emergency heating. The keypad allows the user to turn the fan on and off.

Command packets are assembled by the microcontroller 512 to adjust the environmental conditions in the zone as specified by the user settings. The command packets are transmitted by the radio frequency transmitter 522. To reduce power consumption packets are sent only when command updates are needed in response to changing environmental conditions, user input is received, or at least every 10 minutes. Between packets the transmitter 522 is powered down to further conserve power.

The aggressive power management allows the environmental controller 502 to be powered for more than a year in a typical application using ordinary alkaline AA batteries.

Figure 6:
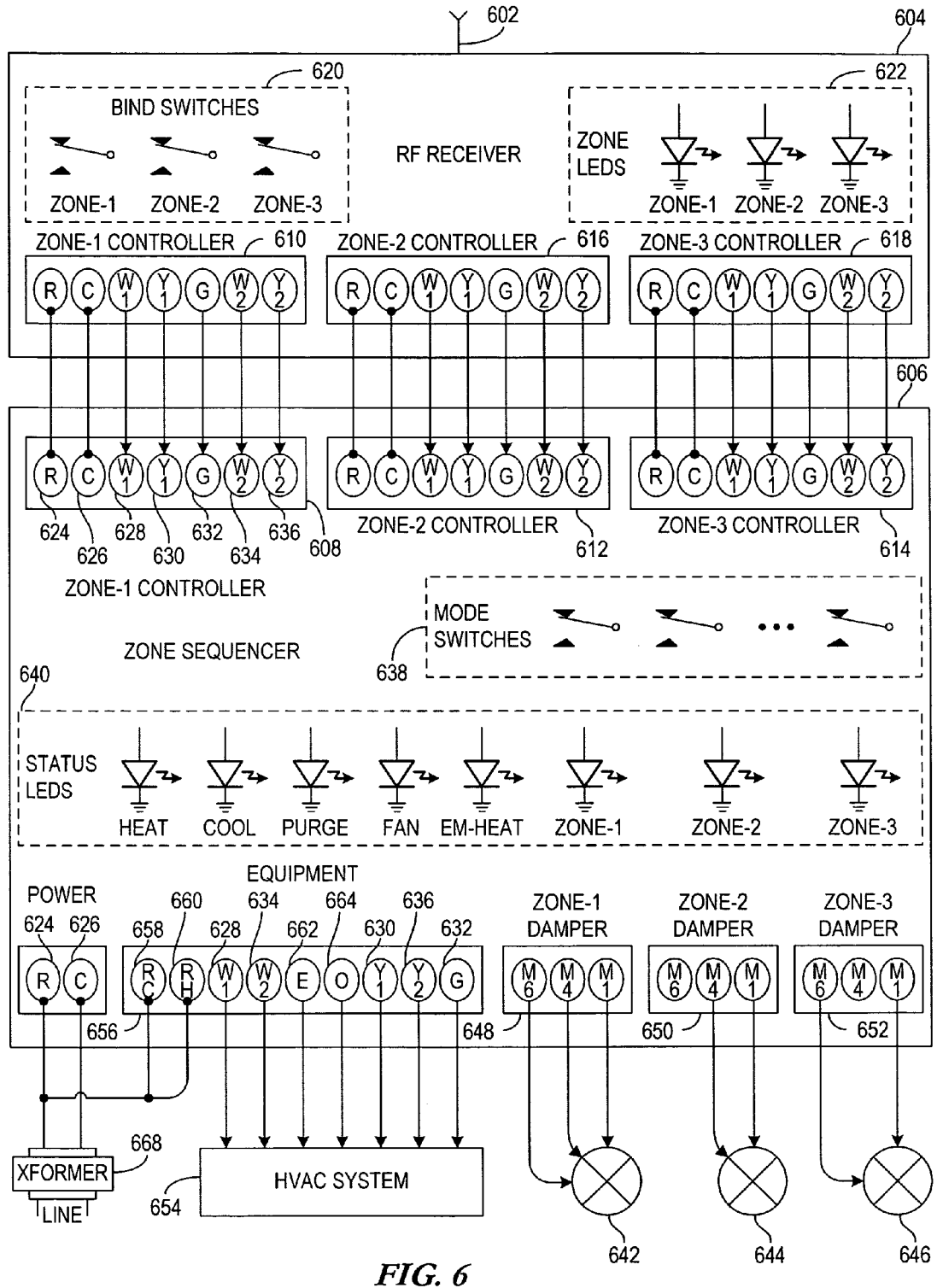
FIG. 6 is a connection diagram of a representative embodiment of a zone controller.

FIG. 6 is a connection diagram for one embodiment of a zone controller with three zones. The illustrated zone controller includes an antenna 602, a radio frequency receiver 604, and a zone sequencer 606. The receiver 604 and the zone sequencer 606 are typically separated to allow the zones to be individually controlled by either a hardwired environmental controller or a radio frequency enabled environmental controller. For example to use a hardwired environmental controller for zone-1, the connections shown for the zone-1 environmental controller connection block 608 on the zone sequencer 606 are replaced with connections to the hardwired environmental controller and the terminals of the zone-1 connection block 610 on the receiver 604 are unconnected. For this example the connection blocks 612, 614 on the zone sequencer 606 respectively remain connected to the connector blocks 616, 618 on the receiver 604.

The receiver 604 decodes command packets received from the environmental controllers via the antenna 602. Each command packet contains an identifier field containing the serial number of the environmental controller that transmitted the packet. The bind switches 620 and zone LEDs 622 are used during installation to bind the environmental controllers to the zones. To bind an environmental controller to a particular zone, the bind switch for that zone is closed by the installer. The receiver 604 responds by starting the blinking of a corresponding zone LED. The installer powers on the environmental controller causing the environmental controller to send a packet. The receiver 604 receives the packet and binds the identifier in the packet to the zone, and stops the blinking of the corresponding zone LED. Thereafter whenever a packet is received with the bound identifier, the command is routed to the output connector block of the connector blocks 610, 616, 618 that corresponds to the bound zone.

The connector blocks 610, 616, 618 on the receiver 604 and the connector blocks 608, 612, 614 on the zone sequencer 606 contain terminals labeled R, C, W1, Y1, G, W2, and Y2 for power 624, ground 626, heat 628, cool 630, fan 632, auxiliary heat 634, and auxiliary cool 636 respectively. Emergency heat, humidity, and extra commands are not supported by this embodiment of the receiver 604 or by this embodiment of the zone sequencer 606. The zone sequencer 606 can be enabled to generate a call for emergency heat in response to exceeding a specified time limit for the duration of a heating cycle.

The receiver 604 checks that a packet is received from each environmental controller at least once every 30 minutes. The receiver 604 handles the case of no packet received from an environmental controller for 30 minutes as an implied idle command from the environmental controller.

The mode switches 638 configure the operation of the zone sequencer 606. The mode switches 638 allow the zone sequencer 606 to support various HVAC systems such as a heat pump and gas burner with air conditioner. The status LEDs 640 indicate the current command being executed by the zone sequencer 606 or changeover purging. Some HVAC systems require a changeover purging period between conflicting commands. The status LEDs 640 also indicate the zone or zones with open dampers.

The three dampers 642, 644, 646 are respectively connected to the damper connectors 648, 650, 652. The zone sequencer 606 supports dampers of type power open and power close 642, power open and spring close 644, and spring open and power close 646.

The HVAC system 654 is connected to the equipment connector 656 of the zone sequencer 606. The equipment connector 656 contains terminals labeled RC, RH, W1, W2, E, O, Y1, Y2 and G for cooling power 658, heating power 660, heat 628, auxiliary heat 634, emergency heat 662, changeover purge 664, cool 630, auxiliary cool 636, and fan 632. The transformer 668 provides zone controller power 624, cooling power 658, and heating power 660.

Figure 7:
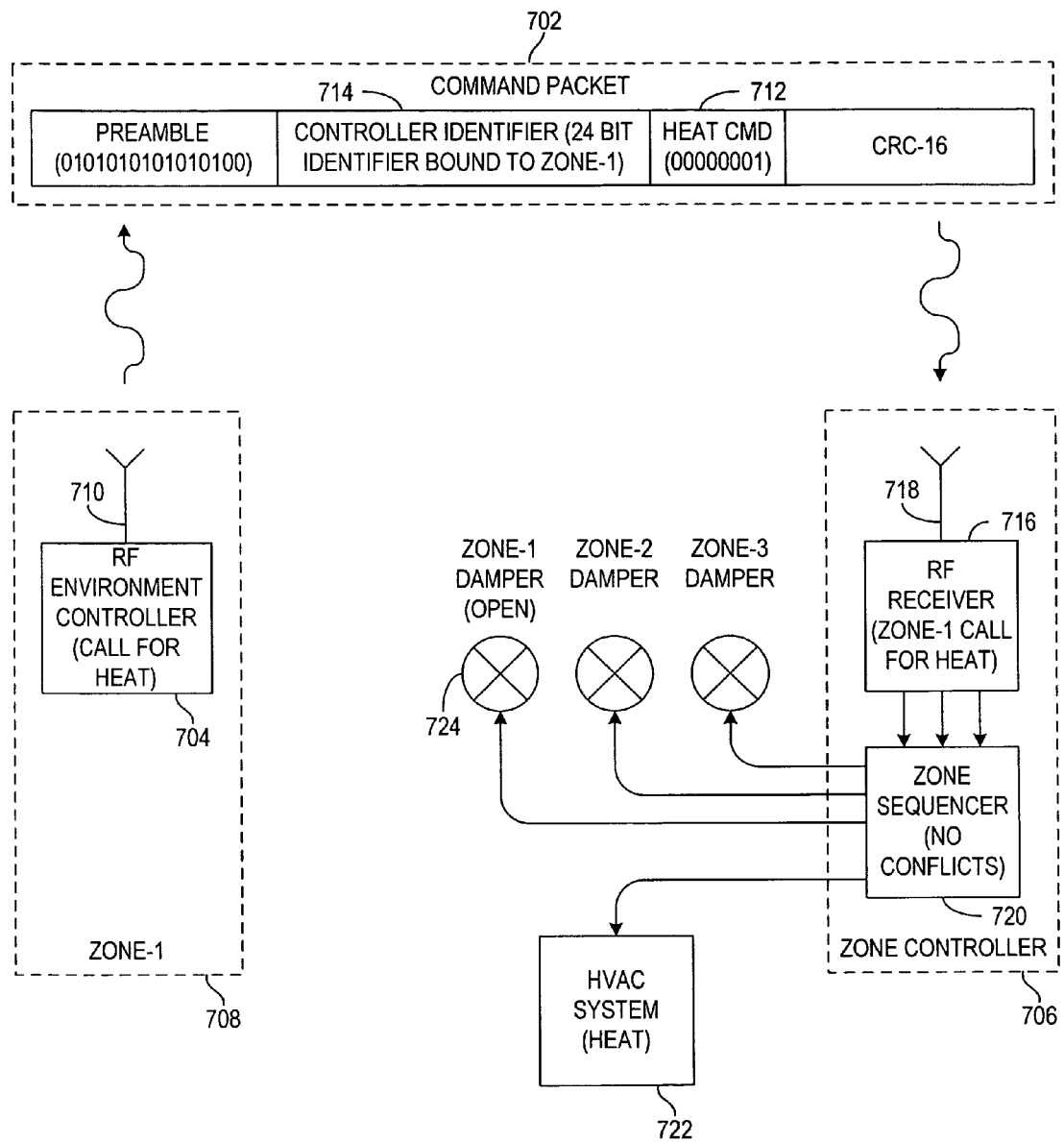
FIG. 7 is a diagram showing an example of unidirectional transmission of command packet from an environmental controller to a zone controller.

FIG. 7 is a diagram showing an example of unidirectional transmission of command packet 702 from an environmental controller 704 to a zone controller 706. The environmental controller 704 in this example is designed to be battery powered, allowing the environmental controller 704 to have a flexible or mobile location within zone-1 708. A battery powered environmental controller 704 requires a careful design to minimize power consumption, especially if ordinary alkaline batteries are used. A design with aggressive power management has the majority of the power consumed by the radio frequency communication circuits. This is true even when the environmental controller 704 has a complex control function such as multiple setpoints over a seven day schedule.

To reduce the power consumption of the radio frequency communication circuits the environmental controller 704 does not have a radio frequency receiver. The environmental controller 704 only transmits packets 702. The transmitter in environmental controller 704 is powered down between packets 702 to further conserve power. Packets 702 are sent only when command updates are needed in response to changing environmental conditions, user input is received, or 10 minutes have elapsed since the last packet 702 was transmitted. To conserve power the idle command may be transmitted only near the beginning of a time period of acceptable conditions in the environmental zone 708, since the receiver 716 typically treats not receiving a packet 702 for 30 minutes as an implied idle command for the zone 708. In additional to transmitting packets 702 only intermittently, the length of the packet 702 is minimized to conserve power.

Putting the results of control decision in the command packet 702 instead of the data that is used to make these control decisions, such as the current temperature, produces shorter packets 702 that need to be sent less frequently. As an example, a drop in temperature does not necessarily result in a control decision to call for heat. Overall power consumption of the environmental controller 704 is reduced by using these command packets 702 even though the environmental controller 704 may need to have more complex control logic.

For this example the temperature in zone-1 708 has just dropped below the minimum desired temperature. The environmental controller 704 makes the control decision to generate a heat command. The environmental controller 704 transmits the heat command packet 702 to the zone controller 706 via antenna 710. The command field 712 of the packet 702 contains the value for a heat command. The environmental controller identifier field 714 contains the identifier for the environmental controller 704 in zone-1 708. The receiver 716 in the zone controller 706 receives this command packet 702 via the antenna 718. For this example the command packet 702 passes the CRC check. The receiver 716 recognizes from the identifier field 714 that this packet 702 is from zone-1 708. The receiver 716 sends the heat command to the zone-1 input of the zone sequencer 720 of the zone controller 706. Currently for this example the zone sequencer 720 has no conflicts such as another zone calling for cooling. Currently for this example the zone sequencer 720 is not imposing a changeover delay from a previous heating or cooling cycle. Since there are currently no conflicts and no changeover delay, the zone sequencer 720 executes the command by signaling the HVAC system 722 to generate heat and opening the zone-1 damper 724.

Figure 8:
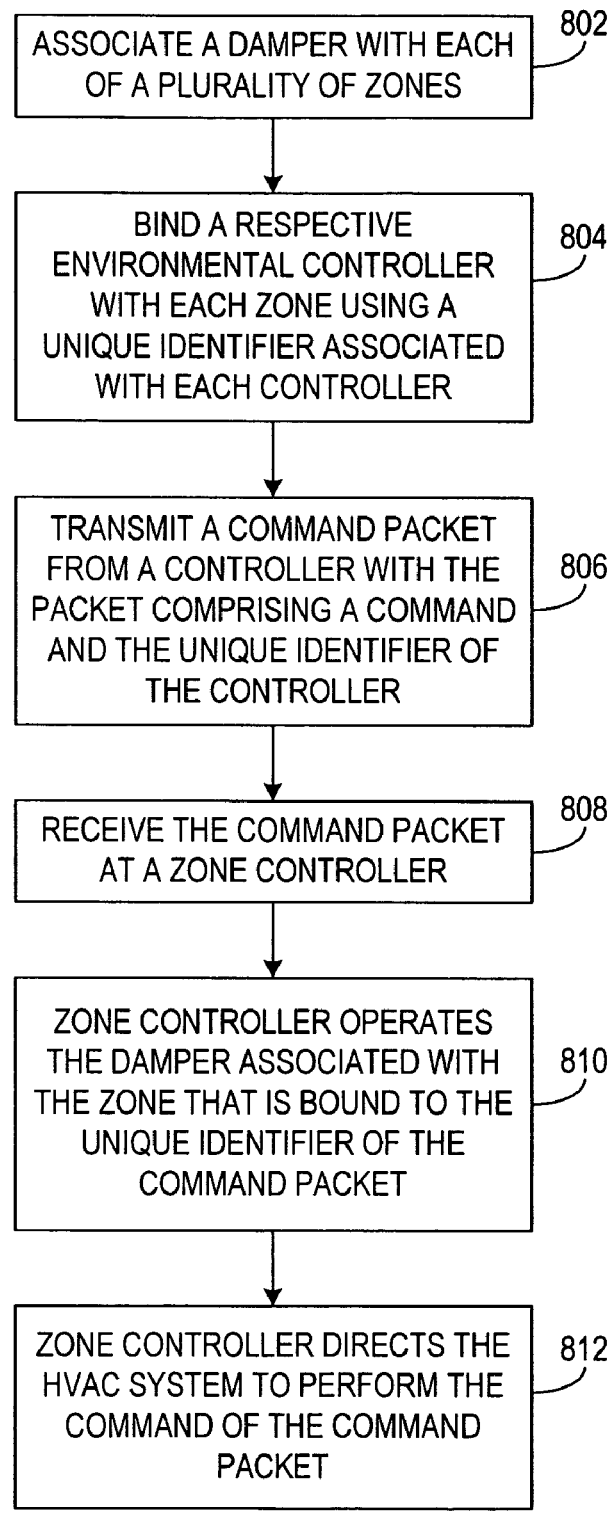
FIG. 8 is a flow diagram of a representative embodiment of a process for control of a plurality of environmental zones.

FIG. 8 is a flow diagram of a representative embodiment of a process for control of a plurality of environmental zones. The process begins at step 802 with the establishment of environmental zones by the installation of a damper for each zone. The dampers are typically located near the HVAC system. The installation can be either a retrofit application or new construction. Installation continues at step 804 by binding an environmental controller with each zone using the serial number of the environmental controller as a unique identifier for the environmental controller. The environmental controllers are located in the corresponding zone.

At step 806 during normal operation, an environmental controller transmits a command packet containing a command and the serial number of the environmental controller as a unique identifier for the environmental controller. At step 808 this command packet is received by the zone controller. At step 810 the zone controller operates the damper corresponding to the zone that was bound to the identifier for the environmental controller. At step 812 the zone controller directs the HVAC system to perform the command contained in the command packet.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined from the claims appended hereto.

What is claimed is:

1. A method for controlling environmental conditions in a plurality of zones using a corresponding plurality of environmental controllers, comprising:
    associating at least one respective damper with each of the plurality of zones;
    binding each environmental controller with a respective one of the zones using respective unique identifiers associated with each of the environmental controllers for subsequent communications without further binding, and for each zone, operating a respective binding switch associated with the zone in connection with a binding process;
    sensing at least one environmental threshold condition at the environmental controller, and in response thereto assembling at least one command to initiate adjustment of the environmental condition of the zone bound to the respective environmental controller;
    wirelessly transmitting the at least one command from respective ones of the environmental controllers that sense the at least one environmental threshold condition, wherein each of the commands includes a respective unique identifier associated with the respective environmental controller;
    receiving the commands at a zone controller configured to receive the commands from the plurality of the environmental controllers;
    determining via the zone controller which of the plurality of zones each received command is associated with, in response to the zone controller receiving the unique identifiers from the respective ones of the environmental controllers; and
    controlling, via the zone controller, the at least one damper in each zone in response to the zone controller determining which of the plurality of zones each received command is associated with.

2. The method of claim 1 further comprising positioning each environmental controller within the zone that is bound with the environmental controller.

3. The method of claim 1, wherein binding each environmental controller is performed in connection with an installation procedure.

4. The method of claim 1, wherein transmitting the at least one command further comprises transmitting the at least one command using a Manchester encoding, and wherein the command includes a preamble.

5. The method of claim 1, wherein transmitting the at least one command further comprises transmitting the at least one command more than once to increase the probability that the zone controller receives the command.

6. The method of claim 1, wherein transmitting the at least one command further comprises transmitting the at least one command in response to any one or more of user input via the environmental controller, environmental conditions at the environmental controller deviating from desired conditions, environmental conditions at the environmental controller returning to desired conditions, or the expiration of a predetermined time interval relative to a previous transmission from the environmental controller.

7. The method of claim 1 wherein the command further includes a cyclic redundancy check used to detect corruption of the command, the method further comprising:
    checking the command received by the zone controller using the cyclic redundancy check; and
    if corruption of the command is detected, discarding the command before binding each environmental controller and controlling at least one damper.

8. The method of claim 1, wherein binding each environmental controller further comprises:
    establishing an association between the zone and the environmental controller that is associated with the unique identifier from the at least one command, thereby binding the environmental controller that transmits the at least one command with the zone.

9. The method of claim 1, further comprising the zone controller resolving a conflict between the command received from a first one of the environmental controllers and the command received from a second one of the environmental controllers by sequentially directing environmental adjustment equipment to execute the command received from the first one of the environmental controllers and the command received from the second one of the environmental controllers.

10. A method for controlling humidity in a plurality of zones using a corresponding plurality of humidity controllers, comprising:
    associating at least one respective damper with each of the plurality of zones;
    sensing at least one humidity threshold condition at the humidity controller, and in response thereto assembling at least one command to initiate adjustment of the humidity of the zone bound to the respective humidity controller;
    from each humidity controller that senses the humidity threshold condition, transmitting the command via unidirectional wireless communication, wherein the command includes a humidity control command and a respective unique identifier associated with the humidity controller;
    receiving the commands from each humidity controller at a zone controller;
    for each zone, operating a respective binding switch associated with the zone in connection with a binding process;
    binding each humidity controller with a respective one of the zones using the respective unique identifier associated with the humidity controller for subsequent communications without further binding, by establishing an association between the zone and the humidity controller that is associated with the unique identifier from the command, thereby binding the humidity controller that transmits the command with the zone;

operating the at least one damper that is associated with the zone that is bound with the humidity controller that is associated with the unique identifier from the command, wherein the at least one damper is operated responsive to the zone controller; and directing humidity adjustment equipment responsive to the zone controller to execute the humidity control command.

11. The method of claim 10, wherein binding each humidity controller is performed in connection with an installation procedure.

12. The method of claim 10, wherein transmitting the command from each humidity controller further comprises transmitting the command from each humidity controller in response to any one or more of user input via the humidity controller, humidity conditions at the humidity controller deviating from desired conditions, humidity conditions at the humidity controller returning to desired conditions, or the expiration of a predetermined time interval relative to a previous transmission from the humidity controller.

13. The method of claim 10, further comprising:
    initiating a visual indication subsequent to operating the respective binding switch; and
    terminating the visual indication subsequent to establishing the association.

14. The method of claim 10, wherein the humidity adjustment equipment comprises a heating, ventilation, and air conditioning (HVAC) system.

15. A heating, ventilation, and air-conditioning (HVAC) environmental control system arranged to control the environmental conditions in a plurality of zones, comprising:
    a plurality of wireless environmental controllers adapted to sense at least one environmental threshold condition at the respective environmental controller, and in response thereto assemble at least one command to initiate adjustment of the environmental condition of the zone bound to the respective environmental controller, and further adapted to wirelessly transmit the commands, each of which includes an environmental control command and a unique identifier for the wireless environmental controller transmitting the command;
    an HVAC subsystem;
    a plurality of dampers each associated with a respective one of the plurality of zones; and
    a zone controller including:
        a wireless receiver adapted to receive the commands from the plurality of wireless environmental controllers,
        means for binding each environmental controller with a respective one of the zones using the unique identifier associated with and received from the respective environmental controller, the means comprising, for each zone, a respective binding switch associated with the zone in connection with a binding process which binds the respective environmental controller to the respective zone for subsequent communications without further binding; and
        means for collectively controlling each of the plurality of dampers in each of the plurality of zones in response to the wirelessly transmitted command from the respective ones of the environmental controllers.

* * * * *